(12) United States Patent
Lamparter et al.

(10) Patent No.: US 10,409,254 B2
(45) Date of Patent: Sep. 10, 2019

(54) KNOWLEDGE-BASED PROGRAMMABLE LOGIC CONTROLLER WITH FLEXIBLE IN-FIELD KNOWLEDGE MANAGEMENT AND ANALYTICS

(71) Applicant: Siemens Aktiengesellschaft, Munich (DE)

(72) Inventors: Steffen Lamparter, Feldkirchen (DE); Lingyun Wang, Princeton, NJ (US); Raffaello Lepratti, Nürnberg (DE); Justinian Rosca, West Windsor, NJ (US)

(73) Assignee: Siemens Aktiengesellschaft, Munich (DE)

( * ) Notice: Subject to any disclaimer, the term of this patent is extended or adjusted under 35 U.S.C. 154(b) by 499 days.

(21) Appl. No.: 14/800,729

(22) Filed: Jul. 16, 2015

(65) Prior Publication Data

US 2017/0017221 A1    Jan. 19, 2017

(51) Int. Cl.
*G05B 19/05* (2006.01)
(52) U.S. Cl.
CPC .. *G05B 19/056* (2013.01); *G05B 2219/14055* (2013.01); *G05B 2219/14058* (2013.01); *G05B 2219/14065* (2013.01); *G05B 2219/14083* (2013.01)
(58) Field of Classification Search
None
See application file for complete search history.

(56) References Cited

U.S. PATENT DOCUMENTS

2008/0313228 A1    12/2008  Clark et al.
2013/0297548 A1*   11/2013  Cescolini ............. G06N 5/00
                                                706/46

FOREIGN PATENT DOCUMENTS

| CN | 201374004 Y | 12/2009 |
| CN | 102708033 A | 10/2012 |
| CN | 103562809 A | 2/2014 |
| DE | 102012207437 B3 | 5/2013 |

OTHER PUBLICATIONS

Pietropaoli et al. "Virtual Sensors", Jul. 2013. (Year: 2013).*
European Search Report dated Dec. 5, 2016; Application No. 16179553.9; Filing Date: Jul. 14, 2016; pp. 12.
(Continued)

*Primary Examiner* — James G Norman

(57) ABSTRACT

A method of operating an intelligent programmable logic controller over a plurality of scan cycles includes the intelligent programmable logic controller executing a control program and one or more reasoning algorithms for analyzing data received and transmitted by the intelligent programmable logic controller. The intelligent programmable logic controller receives one or more user-specified declarative knowledge models from an external source via a deployment interface included in the intelligent programmable logic controller. The intelligent programmable logic controller dynamically modifies the reasoning algorithms during runtime of the control program based on the user-specified declarative knowledge models.

18 Claims, 7 Drawing Sheets

(56) References Cited

OTHER PUBLICATIONS

Vulgarakis Aneta et al: "Task Synthesis for Control Applications on Multicore Platforms", 2014 IITH International Conference on Information Technology: New Generations, IEEE, pp. 229-234, XP032599476, DOI: 10.1109/ITNG.2014.61 ISBN: 978-1-4799-3187-3 / Jul. 4, 2014.
Lopez B. et al: "Ontology for Integrating Heterogeneous Tools for Supervision, Fault Detection and Diagnosis", XP055323282, Retrieved from the Internet: URL:https://pdfs.semanticscholar.org/9265/366ld5blede247170271e25d0bflad338001.pdf / Jan. 1, 2005.
Chinese Office Action dated Jun. 15, 2018; Application No. 201610559254.6; Filing Date: Jul. 15, 2016; pp. 11.

\* cited by examiner

```
(defrule rule_threshold_exceeded ""
    (sensor ?id ?val&:(> ?val 110))
    =>
    (printout t "sensor with id:" ?id " is over 110 (val=" ?val ")" crlf))
```

Fig. 6

```
<?xml version="1.0"?>

<rdf:RDF xmlns="http://www.semanticweb.org/fairfield/ontologies/hardware#"
     xml:base="http://www.semanticweb.org/fairfield/ontologies/hardware"
     xmlns:rdfs="http://www.w3.org/2000/01/rdf-schema#"
     xmlns:xsd="http://www.w3.org/2001/XMLSchema#"
     xmlns:rdf="http://www.w3.org/1999/02/22-rdf-syntax-ns#">

<rdfs:Class rdf:about="http://www.semanticweb.org/fairfield/ontologies/hardware#BinarySensor">
        <rdfs:subClassOf
          rdf:resource="http://www.semanticweb.org/fairfield/ontologies/hardware#Sensor"/>
    </rdfs:Class>

</rdf:RDF>
```

*Fig. 7*

KNOWLEDGE-BASED PROGRAMMABLE LOGIC CONTROLLER WITH FLEXIBLE IN-FIELD KNOWLEDGE MANAGEMENT AND ANALYTICS

TECHNICAL FIELD

The present invention relates generally to the use of a programmable logic controller which includes in-field functionality including knowledge management and analytics. The disclosed technology may be applied to, for example, various automated production environments where programmable controllers are used.

BACKGROUND

A programmable logic controller (PLC) is a specialized computer control system configured to execute software which continuously gathers data on the state of input devices to control the state of output devices. A PLC typically includes three major components: a processor (which may include multiple processor cores and volatile memory), volatile memory comprising an application program, and one or more input/output (I/O) ports for connecting to other devices in the automation system.

PLCs are utilized in various industrial settings to control automation systems. Automation systems typically generate a large amount of data in their daily operations. This data may include, for example, sensor data, actuator and control program parameters, and information associated with service activities. However, conventional automation systems, and PLCs in particular, are not capable of adequately handling this data. For example, in most systems, due to hardware and software limitations, only a small fraction of automation system data can be analyzed and stored. Massive amounts of irrelevant data may be produced while important data points are missed. Compression may be applied at the higher automation layers on unimportant data, while important data is lost while travelling through the automation layers. Moreover, even where there are attempts to avoid the loss of data, there may be significant demands placed on the rest of the computing infrastructure. For example, the PLC data processing may result in a high demand on the network bandwidth as well as storage capacity. Additionally, the context of data may be lost while data passes through automation system layers. This causes several undesired secondary effects on the automation system. For example, if data analytics are performed at higher automation layers based on low quality/fidelity data, important data may be lost causing the automation system to operate inefficiently or sub-optimally.

Today, data such as sensor data or alarms from automation systems is stored, processed and analyzed on SCADA level, MES level and/or above. The problem with this approach is that in many real-world scenarios the complete set of PLC data cannot be sent to remote systems for analysis due to a limited communication bandwidth. This is particularly a problem for high resolution data (e.g. sensor with high sampling frequency) and signals with extreme as well as fast changes in measurements (e.g. current and voltage). In practice this means that events that happen in the shop floor go undetected. An example from the automotive industry are so called micro breaks—short products stops below 2 seconds—caused by problems in process synchronization between two consecutive machines/production modules. Another example is a fast oscillation that happens during positioning of parts which could indicate sensor problems but cannot be detected on SCADA level today.

Conventional PLCs do not provide sufficient support for data provisioning, preparation and analyses required to address these challenges. Data analysis on PLCs is restricted to PLC-hardware specific alarms that are already shipped with the PLC to the customer and are independent of the process that is controlled. In addition, customers can configure process-related alarms using their engineering tools (e.g. TIA) either using the alarm framework for defining simple standard alarms or programming a dedicated function block for more complex events. Data provisioning is done using pre-defined and engineered data blocks. However, deployment of such data blocks, function blocks or alarms requires stopping and updating the PLC as well as many connected devices such as HMIs, SCADA systems, etc.

Specification of data models and analytical procedures should be much more flexible. The conventional approach leads to high engineering (development and programming) effort and also considerably reduces OEE of machines (downtimes required for updates). Adding a new sensor and providing the signals to the SCADA level requires complex re-engineering. The same holds for adding a new monitoring rule or alarm.

SUMMARY

Embodiments of the present invention address and overcome one or more of the above shortcomings and drawbacks, by providing methods, systems, and apparatuses related to a PLC which includes in-field functionality including knowledge management and analytics.

According to one aspect of the present invention, a method of operating an intelligent programmable logic controller over a plurality of scan cycles includes the intelligent programmable logic controller executing a control program and one or more reasoning algorithms for analyzing data received and transmitted by the intelligent programmable logic controller. The intelligent programmable logic controller receives one or more user-specified declarative knowledge models from an external source via a deployment interface included in the intelligent programmable logic controller. The user-specified declarative knowledge models may comprise ontologies expressed, for example, using the Web Ontology Language (OWL). In some embodiments, the user-specified declarative knowledge models comprise a predictive model expressed using the Predictive Model Markup Language (PMML) standard and/or one or more rules expressed using the Rule Interchange Format (RIF) standard. The intelligent programmable logic controller dynamically modifies the reasoning algorithms during runtime of the control program based on the user-specified declarative knowledge models. Additional features and advantages of the invention will be made apparent from the following detailed description of illustrative embodiments that proceeds with reference to the accompanying drawings.

In some embodiments of the aforementioned method, the one or more reasoning algorithms are configured based on one or more vendor-specified knowledge models. For example, in one embodiment, the one or more vendor-specified knowledge models comprise information related to one or more capabilities of the intelligent programmable logic controller, diagnostic knowledge available at the intelligent programmable logic controller, and a data layout information used by the intelligent programmable logic controller.

The various execution steps described above with respect to the aforementioned method may be distributed across the hardware processing resources of the intelligent programmable logic controller in a variety of ways. For example, in some embodiments, the method further includes the intelligent programmable logic controller executing the control program using a first core of a processor included in the intelligent programmable logic controller. The reasoning algorithms may then be dynamically modified using a second core of the processor included in the intelligent programmable logic controller.

In some embodiments, the user-specified declarative knowledge models used in the aforementioned method comprise an indication of one or more soft-sensors available in the control program. For example, in one embodiment, the modification of the reasoning algorithms results in a new reasoning algorithm which performs a process wherein updated soft-sensor values corresponding to the soft-sensors are determined and stored on the intelligent programmable logic controller. during each scan cycle.

According to other embodiments of the present invention, article of manufacture for operating an intelligent programmable logic controller over a plurality of scan cycles comprises a non-transitory, tangible computer-readable medium holding computer-executable instructions for performing the aforementioned method, with or without the various additional features discussed above.

According to other embodiments of the present invention, an intelligent programmable logic controller comprises one or more processors configured to execute according to a scan cycle; a volatile computer-readable storage medium comprising a process image area; a non-volatile computer-readable storage medium; and a plurality of controller components executed by the one or more processors according to the scan cycle. The controller components include a data connector component, a data analytics component, and a contextualization component. The data connector component includes a deployment interface configured to receive one or more user-specified declarative knowledge models from an external source via the deployment interface included in the intelligent programmable logic controller. In some embodiments, the deployment interface includes a web server (e.g., MiniWeb) interface. The data analytics component has an automated reasoner module configured to execute one or more reasoning algorithms for analyzing data received and transmitted via the data connector component. The contextualization component comprises a knowledge manager configured to dynamically modify the one or more reasoning algorithms during runtime of a control program based on the one or more user-specified declarative knowledge models.

The aforementioned may be configured with a variety of processing resources. For example, in some embodiments, the one or more processors comprise a first processor core configured to execute the control program and a second processor core configured to modify the one or more reasoning algorithms in parallel with execution of the control program. In some embodiments, the one or more processors execute a plurality of threads comprising a first thread configured to execute the control program; and one or more second threads configured to modify the one or more reasoning algorithms.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures:

FIG. 6 provides an example of a code snippet which illustrates how rules can be specified in some embodiments; and FIG. 7 provides an example of a document that may be used in some embodiments

DETAILED DESCRIPTION

Figure 1:
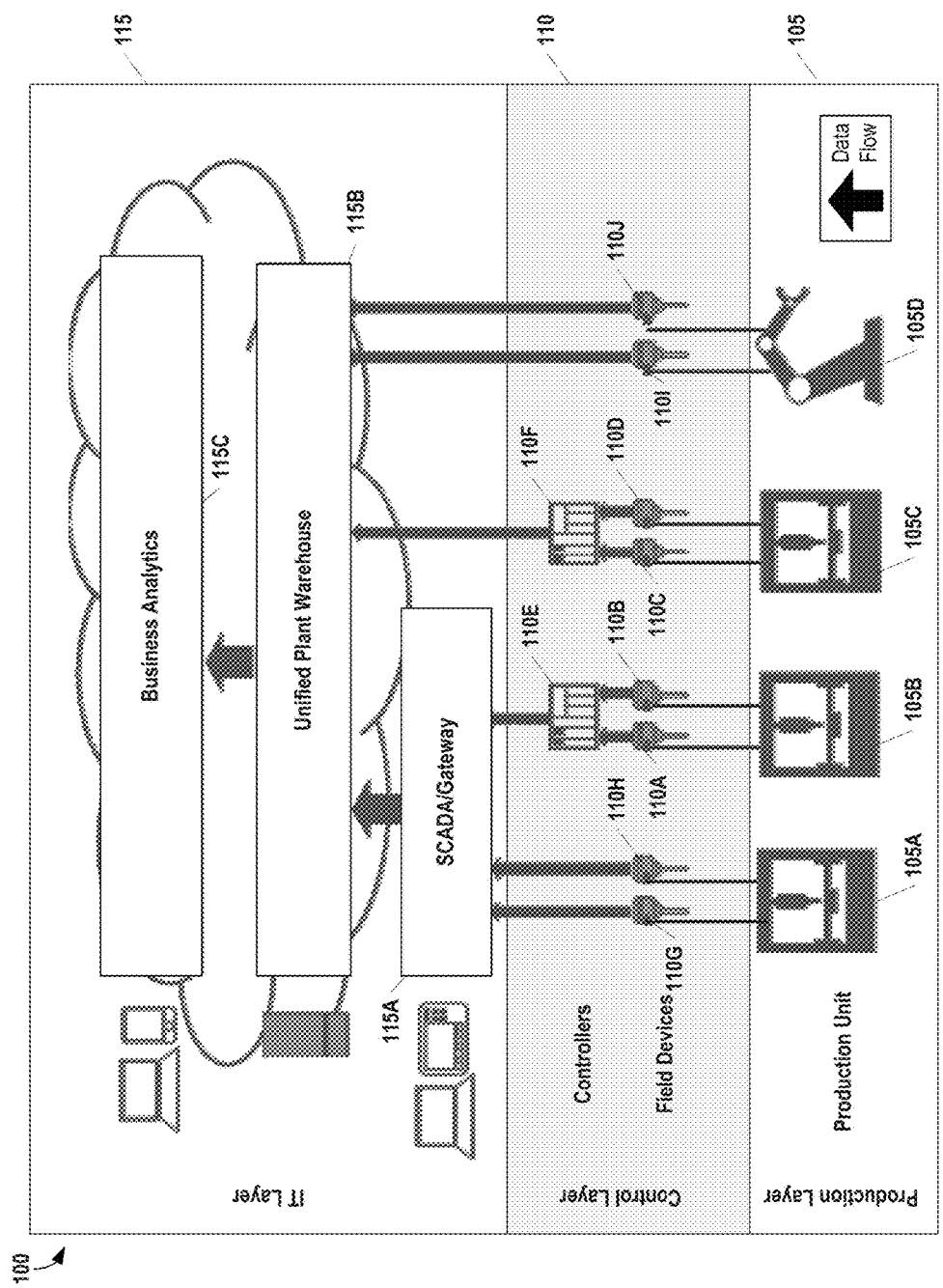
FIG. 1 provides a system view of an Intelligent PLCs integrated into an automation system, according to some embodiments of the present invention.

Systems, methods, and apparatuses are described herein which relate generally to a PLC which includes in-field functionality including knowledge management and analytics. More specifically, the present disclosure describes a PLC-based infrastructure for "injecting" custom knowledge into the automation system. It supports flexible deployment of data models and analytics on automation system controllers. It uses declarative representation of knowledge about data and analytics to dynamically configure a generic data provisioning and analytics component with domain/custom and device specific algorithms during runtime of the automation system. Thereby, the PLC serves as a central data management platform providing all knowledge required for auto-configuration of connected HMI, SCADA and MES systems. Thus, in contrast to conventional techniques which describe analytical functions as imperatively programmed procedural steps, the technology disclosed herein provides a declarative, knowledge-based programming paradigm. This paradigm shift enables dynamic update of data models and analytics on the PLC while providing a rich set of analytics functions to process automation system data.

Various embodiments of the present invention are described in the context of a PLC which includes various components configured to provide an assortment of enhanced functions in control applications. This PLC, referred to herein as an "Intelligent PLC" is described in greater detail in U.S. application Ser. No. 14/467,125 entitled "Intelligent Programmable Logic Controller," the entirety of which is incorporated herein by reference. Briefly, the Intelligent PLC offers several technical features which may be present in various combinations and use different embodiments of the present invention. The Intelligent PLC provides efficient data storage on control layer devices. More specifically, functionality of the control layer may be extended by an efficient storage mechanism for time series data (i.e., a "historian" function) which allows short-/ mid-term archiving of high resolution time-stamped data. With high fidelity data, no events are lost. Efficient compression algorithms (e.g. a variation of swinging door) may be used to reduce storage and communication demands. The Intelligent PLC may also offer an intelligent on-device data generation method in some embodiments. Methods for data filtering may be applied directly where data is generated to ensure that additional data is only stored if it provides additional information content. These methods may also actively analyze incoming data and configure data acquisition according to the current needs, for example, by adjusting the sample rate or by storing data only if certain events have been detected. The Intelligent PLC may also enable rich and semantic contextualization, and perform control layer semantic analytics. Additionally, in some embodiments, the Intelligent PLC also provides distributed analytics across automation systems.

FIG. 1 provides a system view of an Intelligent PLC integrated into an automation system 100, according to some embodiments of the present invention. This example conceptually partitions the industrial environment into a Production Layer 105, a Control Layer 110, and an IT Layer 115. In conventional systems, most data handling functions are performed at the IT Layer 115. Using the Intelligent PLCs 110E and 110F, the system 100 illustrated in FIG. 1 pushes many of these data handling functions down to the Control Layer 110. For example, in some embodiments, historian capabilities such as efficient data compression for time-series data and intelligent filtering of data may be implemented directly on the Intelligent PLCs 110E and 110F. This allows the Control Layer 115 to utilize high-fidelity data with less storage/communication effort such that few, if any, events go undetected. In some embodiments, the Intelligent PLCs 110E and 110F also provide rich contextualization functionality. By adding control level knowledge to data, it may not be necessary to re-discover knowledge on Business Analytics 115C at the IT Layer 115. Additionally, in some embodiments, the Intelligent PLCs 110E and 110F provide data analytics functionality directly on their respective device, thus increasing machine and process efficiency.

Continuing with reference to FIG. 1, at the Production Layer 105, one or more production units (e.g., Unit 105A) operate. Each production unit sends and receives data through one or more field devices (e.g., Field Device 110A) at the Control Layer 110. At the Control Layer 110, each field device may be connected to an Intelligent PLC (e.g., Intelligent PLC 110E). Data received from the production units is transferred (either directly by the field devices or via an Intelligent PLC) to the IT Layer 115. The IT Layer 115 includes systems which perform various post-processing and storage tasks. The example of FIG. 1 includes a Supervisory Control and Data Acquisition (SCADA) Server (or Gateway) Component 115A. This Component 115A allows an operator to remotely monitor and control the devices at the Control Layer 110 and Production Layer 105. Additionally, the SCADA Server Component 115A collects data from the lower layers 105, 110 and processes the information to make it available to the Unified Plant Knowledge Warehouse 115B. The Unified Plant Knowledge Warehouse 115B provides further processing and storage of the data received from the lower layers 105, 110. Various functionality may be provided by the Unified Plant Knowledge Warehouse 115B. For example, in some embodiments, the Unified Plant Knowledge Warehouse 115B includes functionality for generating analytics based on the data generated by the lower layers 105, 110.

Each Intelligent PLC 110E and 110F includes three basic portions: a processor (which may include multiple processor cores), a non-transitory, non-volatile memory system, and a data connector providing input/output functionality. The non-volatile memory system may take many forms including, for example, a removable memory card or flash drive. Applications that may execute within the Intelligent PLCs 110E and 110F are described in greater detail below with reference to FIG. 2. The data connector of Intelligent PLC 110E is connected (wired or wirelessly) to Field Devices 110A and 110B. Similarly, the data connector of Intelligent PLC 110F is connected to Field Devices 110C and 110D. Any field devices known in the art may be used with the Intelligent PLC described herein. Example field devices that may be used with the Intelligent PLC include, without limitation, pressure switches, sensors, push buttons, flow switches, and level switches. Note that the Intelligent PLCs 110E and 110F may be integrated into the production environment piecemeal. For example, in FIG. 1, Production Units 105B and 105C are connected through their respective field devices to Intelligent PLCs 110E and 110F, while Production Units 105A and 105D communicate directly through their respective Field Devices 110G, 110H, 110I, 110J to the Unified Plant Knowledge Warehouse 115B.

The Intelligent PLCs 110E and 110F may enrich data using additional context dimensions compared to state of the art systems (e.g., control knowledge, environmental conditions, and service incidences). This allows insights to be made from data analytics with higher confidence and quality. In some embodiments, the system 100 uses semantic data representation languages and standards for contextualization of data in automation systems. This allows business analytics as well as SCADA-level historians (e.g. OSI PI asset framework) to be configured with minimal effort for integration with data from other systems/devices/sources. Also, the system 100 may provide model-based semantic analytics at the Control Layer 110. Thus, analytical algorithms can be updated during device runtime and root cause analysis can be improved by providing explicit access to models (instead of compiled logic in a function block). In some embodiments, the system 100 introduces a distributed data sharing system in the Control Layer 110 and integrates with external Big Data infrastructures. Thus, applications can access all required data independent from storage location.

In addition to the typical sensor inputs and control outputs that are transferred to the IT Layer 115 or the Production Layer 105, the Intelligent PLCs 110E and 110F may store, utilize, and historize local control-layer parameters and variables, which in conventional automation systems are hidden inside the Control Layer 110.

Figure 2:
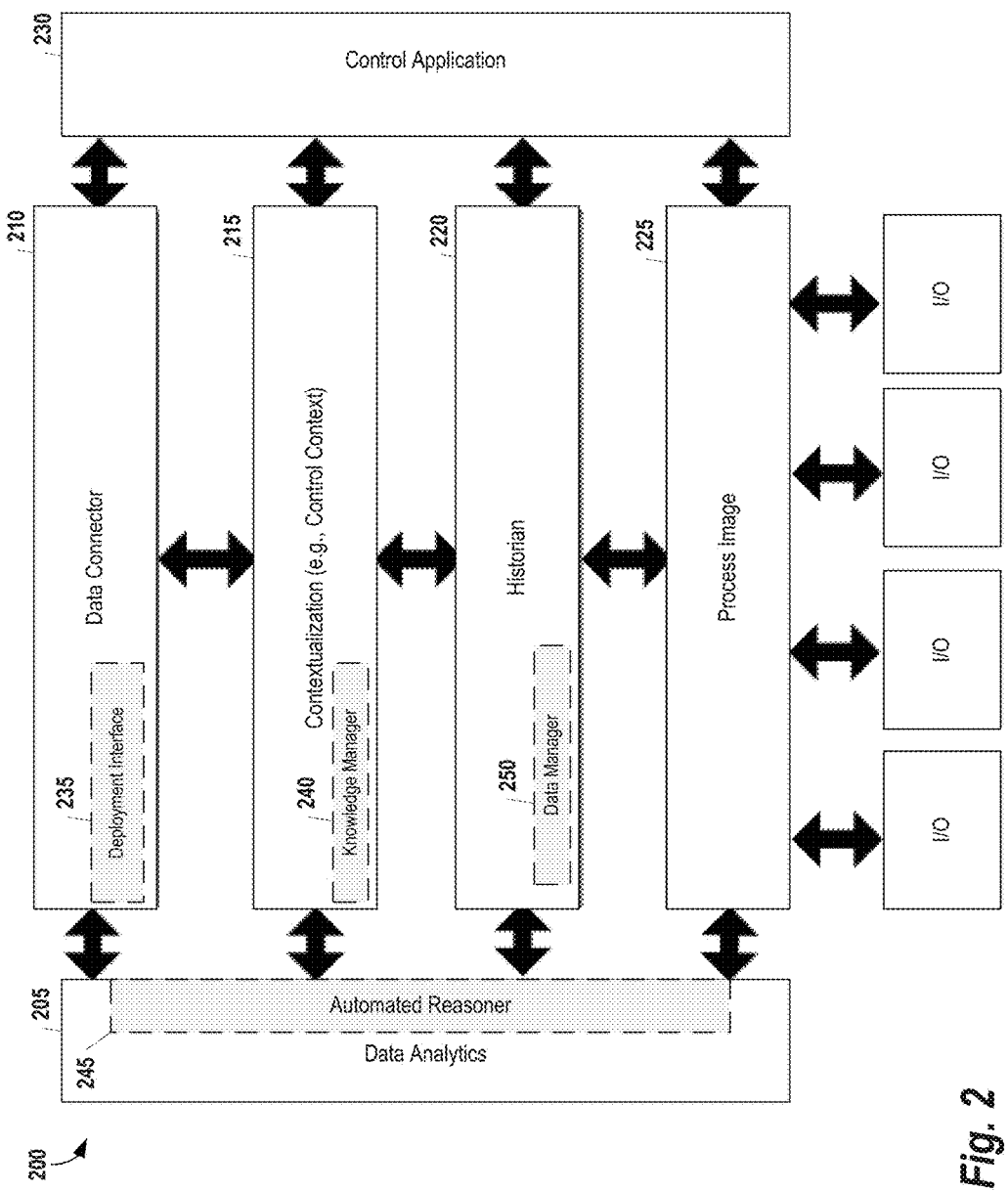
FIG. 2 provides an illustration of the system components included in an Intelligent PLC with components supporting a knowledge-based controller architecture.

FIG. 2 provides an illustration of the system components 200 included in an Intelligent PLC utilizing a knowledge-based controller architecture, according to some embodiments of the present invention. Process Image Component 225 is a memory area in a controller's CPU volatile system memory which is updated in each processing/scan cycle based on data associated with the production devices (e.g., the inputs and outputs of connected I/Os). In each processing step, the Control Application 230 reads the Process Image Component 225, executes deployed application logic, and writes results back into the Process Image Component 225.

Continuing with reference to FIG. 2, the process image of each cycle is read and permanently stored on a non-volatile physical storage medium by the Historian Component 220. In some embodiments, this Historian Component 220 is configured to deploy data compression algorithms to reduce data volume. It thereby can provide applications with access to past process images. Data may be stored either for a fixed time window or as online algorithms which may be used to realize dynamic caching heuristics. As part of the Historian Component 220, intelligent data generation algorithms may continuously analyze the process image and context to adjust data generation parameters (e.g. sampling rate) of connected I/Os. For example, for fast changing sensor signals, a high sampling rate may be selected while for slowly changing sensor signals a lower sampling rate is sufficient.

Data Manager 250 is a module that may be included in some embodiments to provide additional data management functionality at the Historian Component 220. For example, the Data Manager 250 may be used to manage the input and output of the system 200. This input and output may include, for example, data from sensors, actuators as well as control variables and control parameters. Traditionally in a controller, this role is realized by the process image alone. In addition, in some embodiments, the Data Manager 250 may also include a database to store historic data for the various inputs and outputs.

The Data Analytics Component 205 comprises a set of data analysis algorithms that process the current or past process images (queried from the historian). Various data analysis algorithms may be included in the Data Analytics Component 205. For example, in some embodiments, these algorithms include one or more of clustering, classification, logic-based reasoning, and statistical analysis algorithms. Moreover, algorithms may be specified via a model which can be deployed during runtime on the device. The Data Analytics Component 205 may also include various analytical models and dedicated algorithms to interpret these models. The results generated by the Data Analytics Component 205 may be stored in the Historian Component 220, written back to the Process Image Component 225 and/or provided to external components via the Data Connector Component 210. Thus, the Intelligent PLC may be viewed as a device for providing distributed analytics to the other devices in the automation system.

Automated Reasoner 245 is a module included as part of the Data Analytics Component 205. The Automated Reasoner 245 includes at least one reasoning model (implemented in C, C++, Java, etc.) that can be dynamically configured by a declarative knowledge model (e.g. ontology in RDF/OWL standard, predictive model expressed using PMML standard, rules expressed via RIF standard). Based on this configuration, the incoming and outgoing data accessible via the Historian 220 (e.g., data from the Data Manager 250) may be continuously analyzed. Each reasoning model includes one or more reasoning algorithms. Examples of automated reasoning algorithms that may be implemented by the Automated Reasoner 245 included, without limitation, deductive reasoning with classical logics and calculi, fuzzy logic, rule engines and logic programming, model checking, Bayesian inference and inductive reasoning methods including machine learning methods.

Because the Automated Reasoner 245 can be dynamically configured, it may be used to provide additional functionality not available on static systems. For example, the learning of improved monitoring and alarming functions becomes possible. New knowledge can be detected based on historic data. For example, rules or rule parameters can be learned that allow detection of quality problems in a manufacturing process. These rules can be dynamically deployed in the rule engine and are used automatically in the next control cycle. Additionally, in some embodiments, one or more soft-sensors may be added to the Controller 200. Each soft sensor provides access to a control layer variable that would ordinarily not be accessible outside of the Controller 200. Thus, by dynamically activating a particular soft-sensor, the data may be made available, for example, via the Data Connector 210. Additional information on soft-sensors may be found in International Application No. PCT/US14/63105 entitled "Using Soft-Sensors in a Programmable Logic Controller," the entirety of which is incorporated herein by reference.

A Contextualization Component 215 annotates incoming data with context information to facilitate its later interpretation. Context information, as used herein, may include any information that describes the meaning of data. For example, context of data in automation systems may include information about the device that generated the data (e.g., a sensor), about the structure of the automation system (e.g., topology of a plant), about the working mode of the system (e.g., downtime event), about the automation software and its status while the data was generated, and/or about the product/batch that was produced while the data was generated. The Contextualization Component 215 is configured to provide data to any of the other components for more specific processing needs. The context information generated by the Contextualization Component 215 may not be restricted to the asset structure but may also include control knowledge, product-specific information, process information, event information, and potentially other aspects such external events like weather information. Some context information may be imported from engineering tools (e.g. Siemens Totally Integrated Automation tools). Additionally, in some embodiments, the Contextualization Component 215 provides semantic contextualization. The context may be represented by a standard modeling language (e.g. Web Ontology Language, Resource Description Framework) where the meaning of the language constructs is formally defined. Contextualization of data with these semantic modeling standards enables business analytics applications to automatically understand and interpret the data provided from the automation system without manual configuration effort.

Knowledge Manager 240 is part of the Contextualization Component 215. The Knowledge Manager 240 administrates the declarative knowledge models that are received via a Deployment Interface 235 (described below). This administration may include, for example, storing the models and providing an API for accessing and manipulating the models. Example representation languages for declarative knowledge model include, without limitation, ontologies in RDF/OWL standard, predictive model expressed using PMML (Predictive Model Markup Language) standard, rules expressed via RIF (Rule Interchange Format) standard, etc.

Using the functionality of the Data Analytics Component 205 and the Contextualization Component 215 described herein, the scope of analysis and optimization may be expanded to cover the production processes themselves and is not limited to the Intelligent PLC itself or the area of the directly controlled devices. For example, the focus of analytics on the Intelligent PLC may be not only be to ensure the functioning of the Intelligent PLC and its connected sensors and actuators (e.g., HW-specific alarm rules) but also to optimize the controlled production process in a larger context (e.g., based on knowledge of the application domain and infrastructure)

Any data captured or generated by the components of system 200 may be provided to external components via a Data Connector Component 210. In some embodiments, the Data Connector Component 210 delivers data via a push methodology (i.e., actively sending to external component). In other embodiments, a pull methodology may be used where data is queried by external component). Additionally, push and pull methodologies may be combined in some embodiments such that the Intelligent PLC is configured to handle both forms of data transfer.

Deployment Interface 235 is a module included as part of the Data Connector Component 210. The Deployment Interface 235 provides access to the knowledge and data management functionality of the system 200 in order to read and write imperative or declarative knowledge, as well as data. The Deployment Interface 235 may utilize communication protocols and standards such as, for example, OPC, HTTP, REST, STEP7, TCP/IP, etc. Knowledge that is transferred via the Deployment Interface 235 may be expressed using declarative knowledge representation languages/standards as used by the Knowledge Manager 240.

Figure 3:
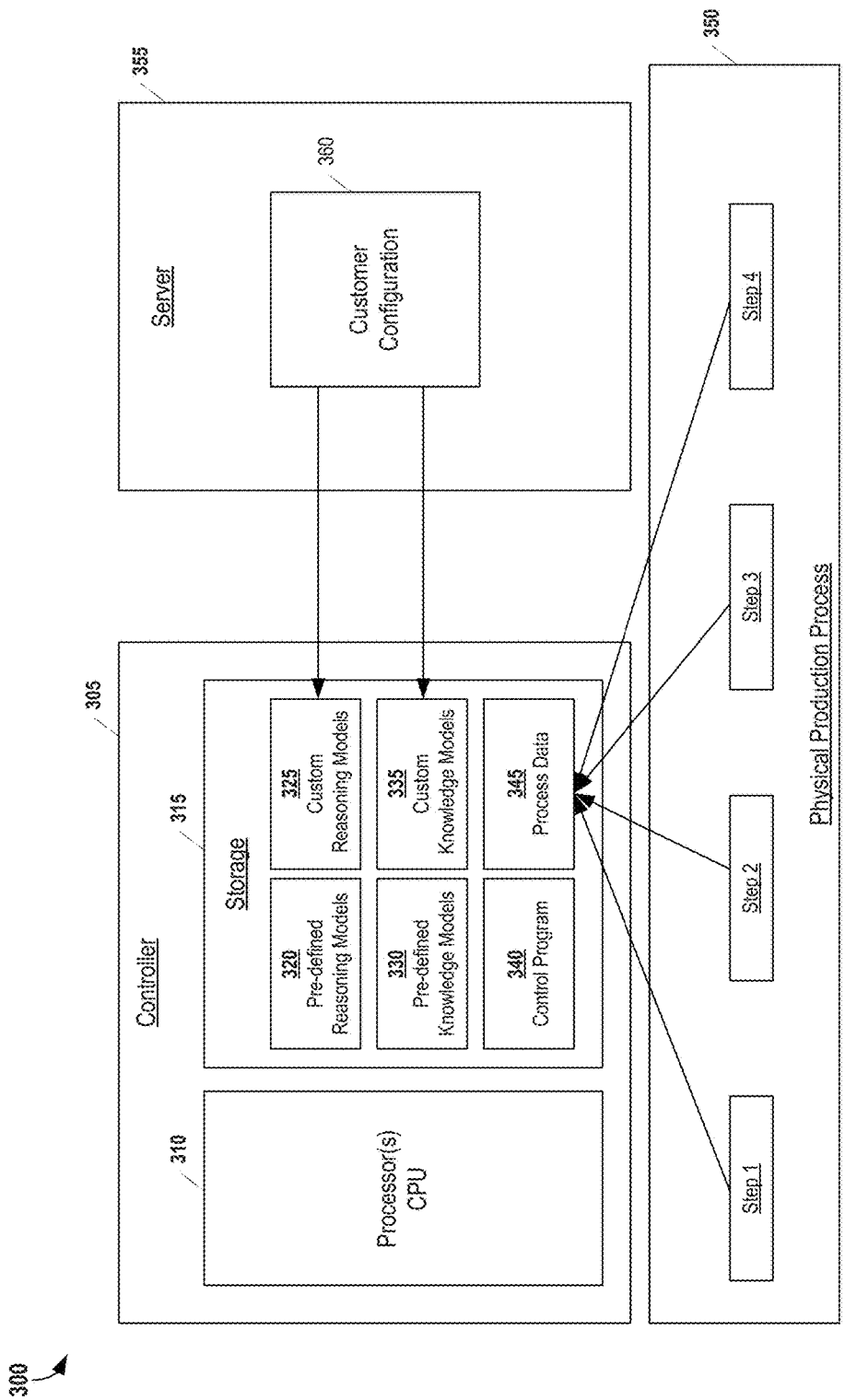
FIG. 3 provides an illustration of various hardware components that may be used in different embodiments.

FIG. 3 provides an illustration of various hardware components that may be used in different embodiments. Briefly, Process Data 345 includes data written to the Controller 305 by one or more devices involved in a Physical Production Process 350. Control Program 340 reads and interprets this data to allow it to provide further instructions for the devices involved in a Physical Production Process 350.

The Controller 305 comprises one or more Processors 310 and a Storage Medium 315. The Processors 310 may include one or more processors, each processor comprising one or more cores. The Storage Medium may be used by the Knowledge Manager to store all relevant knowledge models as well as by the Data Manager (see FIG. 2) to store all incoming and outgoing data. This data could include, for example, current data (e.g. data of current control cycle) as well as historic data (e.g. data from previous control cycles).

Two types of reasoning models are stored in the Storage Medium 315. Pre-defined Reasoning Models 320 are pre-defined by the control system vendor and Customer Reasoning Models 325 can be dynamically changed by users. The Reasoning Models 320, 325 integrate at least one reasoning algorithm (specified in a procedural or declarative way) into the Controller 305 which, in turn, processes the Knowledge Models 330, 335 and incoming data. To realize the deployment of such algorithms on the Controller 305, the reasoning algorithms may be adapted to run on the limited resources (e.g. storage space, processing power, data availability, communication bandwidth, programming languages). Additional detail on the implementation of reasoning algorithms is presented above with respect to the Automated Reasoner 245 in FIG. 2.

The example Storage Medium 315 stores two types of knowledge models. Pre-defined Knowledge Models 330 are predefined by the control system vendor, while Customer Knowledge Models 335 can be dynamically changed by users. Typically the knowledge models 330, 335 are connected syntactically via shared signature items, and semantically via assertions on the relation between elements of the different models (such as specialization/generalization, connectedness via relations, etc.). Knowledge represented in the Pre-defined Knowledge Models 330 may include, for example, the capabilities of the device, diagnostic knowledge, and data layout. The Custom Knowledge Models 335 may build on these to express, for example, process-specific information on parameters, required functionalities, or process-specific analytical functionality.

To customize the Customer Reasoning Models 325 and/or the Custom Knowledge Models 335, an external Server 355 is used. Connection between the Server 355 and Controller 305 is realized using the Deployment Interface (not shown in FIG. 3) installed in the controller. Customers create a Customer Configuration 360 on the Server 355 with information such as, without limitation, desired rules, parameter, and/or attribute values. Depending on the particular embodiment, customers may create the Customer Configuration 360, for example, by modifying one or more values in an existing configuration file, but answering a set of questions or selecting items presented in a graphical user interface, or by creating a text file specifying the configuration information in a structured language format. The Customer Configuration 360 is then transferred to the Deployment Interface on the Controller 350. Once received, the Controller 305 uses the Customer Configuration 360 to dynamically modify the appropriate data items on the Controller 305.

The Process Data 345, the Knowledge Models 330, 335, and the Reasoning Models 320, 325 are loaded into the Processors 310 where the Reasoning Models 320, 325 are configured with the Knowledge Models 330, 335 and executed based on the Process Data 345. In some embodiments, the various models execute on the same processor resources as the control program, while in other embodiments, different processor resources are used. For example, in one embodiment, the control program executes on one core of the Processors 310, while the reasoning algorithms execute on other cores of the Processors 310.

Using this system 300, analytical methods can be deployed/uploaded/edited in the living system while the remaining functionality (e.g. Control Program 340) remains operative, with a declarative model interpreted in one or more separate threads of the Processors 310. Thus, the various models 320, 325, 330, and 335 can be extended dynamically during runtime operations of the Controller 305. This may be used to implement customer specific knowledge such as, for example, process dependent alarms.

Figure 4:
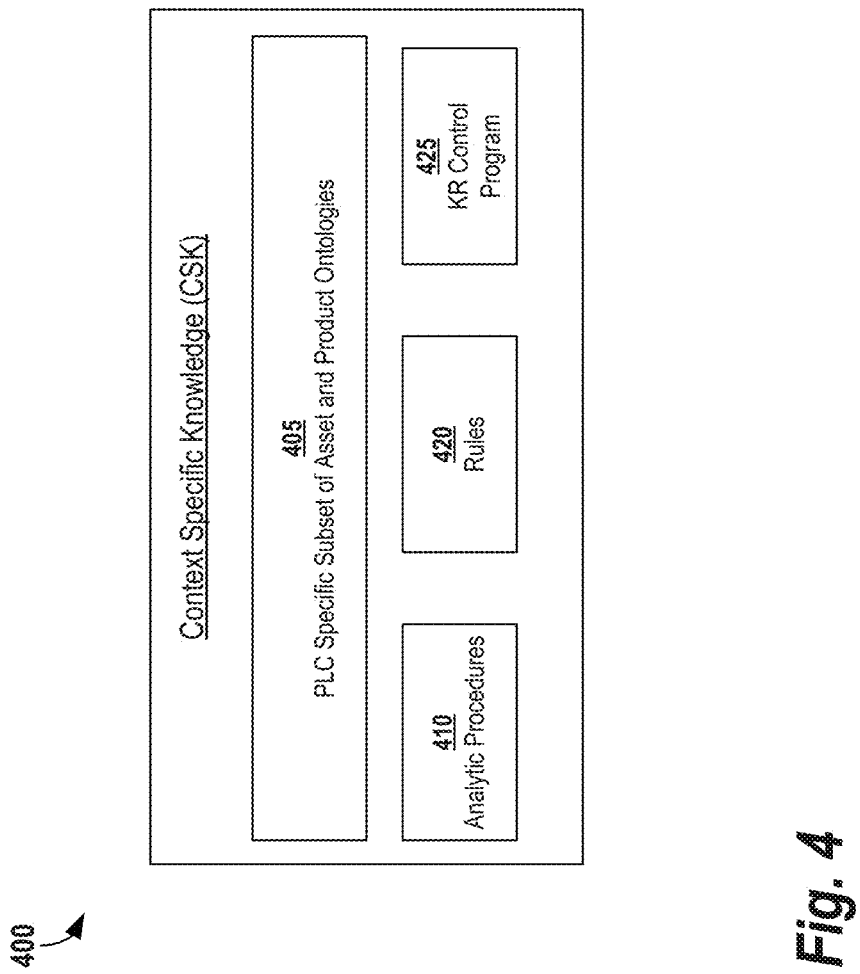
FIG. 4 provides an illustration of the types of knowledge contained in the knowledge model, according to some embodiments.

FIG. 4 provides an illustration of the context specific knowledge (CSK) 400 contained in an example knowledge model, according to some embodiments. This knowledge includes Subset of Asset and Product Ontologies 405 which are specific to the particular controller and used to describe the topology of the automation system and production equipment as well as the structure/genealogy of the product. In addition, knowledge about the control program and its internal dependencies might be available on the PLC via the KR Control Program 425 portion of the CSK 400. Declarative descriptions of Rules 420 and Analytical Procedures 410 formalize the algorithms used for analyzing the data. All knowledge is made accessible via the Knowledge Manager to the Automated Reasoner (see FIG. 2). The Automated Reasoner evaluates the models based on concrete data from the Historian Component of the PLC (see FIG. 2).

Figure 5:
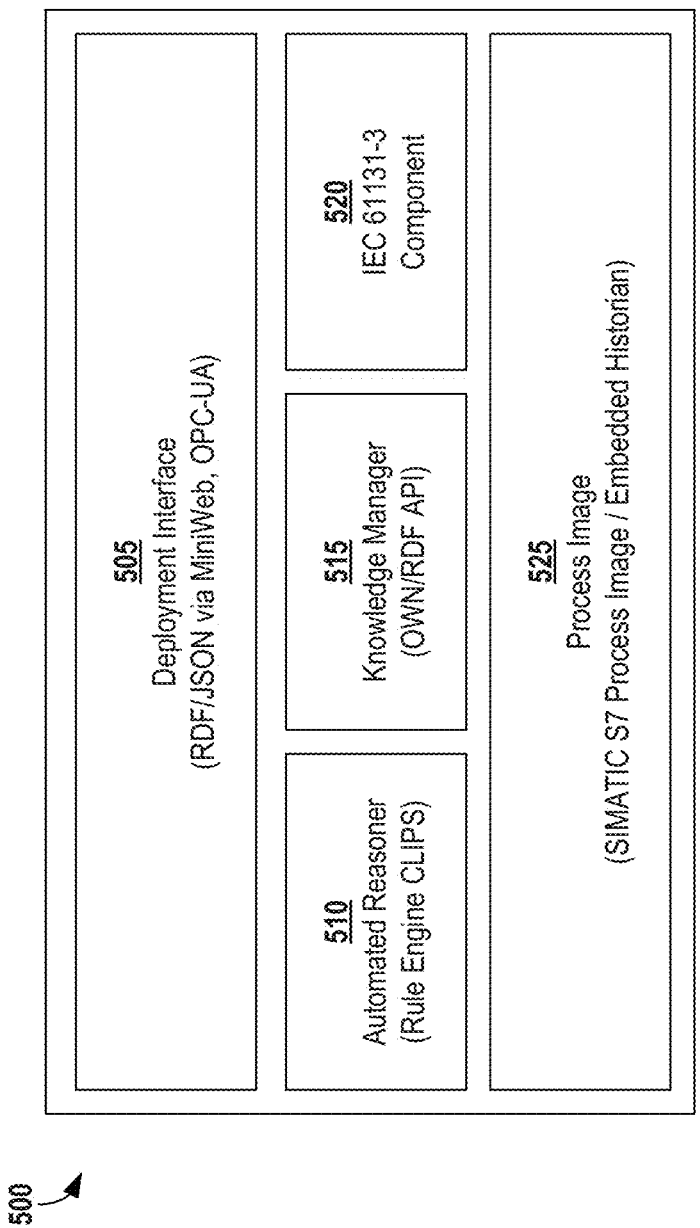
FIG. 5 provides an execution example with software modules that may be utilized in some embodiments.

FIG. 5 provides an execution example of a Software Environment 500 as it may be implemented on a S7-1500 PLC a Knowledge-based PLC, according to some embodiments. The Process Image 525 in this example includes the software for managing a process image for a SIMATIC S7 Process Image device, as well as embedded historian functionality. Additionally an IEC 61131-3 Component 520 included in the Software Environment 500 provides support for functionality related to the third part of the open international standard IEC 61131 for programmable logic controllers, IEC 61131-3. As is understood in the art, IEC 61131-3 describes PLC programming languages, as well as concepts and guidelines for creating PLC projects. For example, the IEC 61131-3 provides standards regarding the use of programming languages such as Ladder Diagram (LD), Instruction List (IL), Function Block Diagram (FBD), Structured Text (ST) and Sequential Function Chart (SFC). For realizing the concept, three components have been added to the conventional firmware: Deployment Interface 505, Automated Reasoner 510, and Knowledge Manager 515.

The Deployment Interface 505 in this example allows rules and ontology files to be uploaded and changed via interfaces in the existing MiniWeb-Server of the PLC. The exchange format can be the CLIPS syntax (as shown in FIG. 5) or a standard such as the W3C standard Rule Interchange Format (RIF). The rules may be stored, for example, in a dedicated file "rules.clp" which is interpreted each time the run( )-method of the rule engine is called. Due to the declarative specification, rules can be changed during runtime of the Intelligent PLC (i.e., between two calls of the run( )-method). FIG. 6 provides an example code snippet 600 which illustrates how rules can be specified in some embodiments.

Automated Reasoner 510 enables the declarative specification of processing logic within the Intelligent PLC. It is applied for identification of relevant situations that should be added as event context to the generated sensor data. For detection of relevant situations and for generation of events, a forward chaining rule engine (production rule system) processes all incoming facts (e.g., sensor values) and matches them with the conditions of the rules (left-handside) to determine which rules have to be applied. This processing may be performed, for example, using a conventional algorithm such as the Rete algorithm. In the example of FIG. 5, the Automated Reasoner 510 is implemented using C Language Integrated Production System (CLIPS), a conventional expert system development tool that includes a production rule engine that is based on the Rete algorithm. Using CLIPS, the Automated Reasoner allows rules to be specified using ontology classes and instances directly using object patterns.

The Knowledge Manager 515 administers the declarative knowledge models used in the Software Environment 500. Thus, for example, Knowledge Manager 515 provides an API for storing the ontology files associated with individual knowledge modes and for querying/updating the files (e.g. what sensors are contained?). Each knowledge model may be specified in a document according to the W3C OWL/RDF or OPC-UA standard. FIG. 7 provides an example of a document 700 that may be used in some embodiments. Thus, each knowledge model offers a vocabulary that may be used in defining the rules or for querying the Process Image 525.

The various systems, methods, and apparatuses described herein offer several benefits over conventional technology. For example, the disclosed technology may be used to reduce maintenance downtime of production line as knowledge can be updated during operation. Additionally, the disclosed technology makes it easy to "inject" expert knowledge into controller, (e.g. adding of diagnostic rules). This allows end-users/domain experts to easily adapt monitoring/alarming functions to their needs. With the disclosed technology, there is also less effort to change data analytics and data preparation procedures on controllers (e.g. no programming needed to aggregate, translate, etc.). Moreover, since all knowledge is specified declaratively, it is directly accessible to data analytics algorithms and can be used to explain results or refine algorithms. For example, learning of additional knowledge becomes easier and more flexible. Additionally, the learning algorithms can make use of the knowledge. In turn, this improves results of analysis (e.g. better predictions, less false positives/negatives) and analytical depth due to better data availability (higher data fidelity and additional control specific knowledge not available outside of the controller).

The processors described herein as used by control layer devices may include one or more central processing units (CPUs), graphical processing units (GPUs), or any other processor known in the art. More generally, a processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

Various devices described herein including, without limitation to the control layer devices and related computing infrastructure, may include at least one computer readable medium or memory for holding instructions programmed according to embodiments of the invention and for containing data structures, tables, records, or other data described herein. The term "computer readable medium" as used herein refers to any medium that participates in providing instructions to one or more processors for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks. Non-limiting examples of volatile media include dynamic memory. Non-limiting examples of transmission media include coaxial cables, copper wire, and fiber optics, including the wires that make up a system bus. Transmission media may also take the form of acoustic or light waves, such as those generated during radio wave and infrared data communications.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically, wholly or partially in response to user command. An activity (including a step) performed automatically is performed in response to one or more executable instructions or device operations without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

We claim:

1. A method of operating an intelligent programmable logic controller using custom knowledge models for data monitoring and control of production devices for a physical production process in an automation system, the method comprising:

executing, by the intelligent programmable logic controller, a control program that reads process data received from one or more production devices and provides instructions to control the one or more production devices;

storing, by the intelligent programmable logic controller, a pre-defined knowledge model and a custom knowledge model connected syntactically via shared signature items and connected semantically via assertions on relation between elements of the pre-defined knowledge model and the custom knowledge model, wherein the custom knowledge model includes user-specified declarative knowledge having at least one of process-specific information on parameters, required functionalities, or process-specific analytical functionality;

storing, by the intelligent programmable logic controller, a pre-defined reasoning model and a custom reasoning model, wherein the pre-defined reasoning model and the custom reasoning model integrate one or more reasoning algorithms into the intelligent programmable logic controller;

executing, by the intelligent programmable logic controller, the one or more reasoning algorithms for analyzing data received and transmitted by the intelligent programmable logic controller, wherein the reasoning algorithms process the pre-defined knowledge model and the custom knowledge model with the process data for learning improved monitoring and alarming functions;

receiving, by a deployment interface of the intelligent programmable logic controller, a customer configuration from an external server, the customer configuration having information including rules, parameters, and attribute values for customizing the custom knowledge model and the custom reasoning model; and dynamically modifying, by the intelligent programmable logic controller, the configuration of the one or more reasoning algorithms during runtime of the intelligent programmable logic controller based on the customer configuration, while remaining functionality of the control program remains operative in one or more separate processing threads.

2. The method of claim 1, wherein the one or more predefined knowledge models comprise information related to one or more capabilities of the intelligent programmable logic controller, diagnostic knowledge available at the intelligent programmable logic controller, and a data layout information used by the intelligent programmable logic controller.

3. The method of claim 1 wherein the one or more user-specified declarative knowledge models comprise ontologies.

4. The method of claim 1 wherein the one or more user-specified declarative knowledge models comprise a predictive model.

5. The method of claim 1 wherein the one or more user-specified declarative knowledge models comprise one or more user-defined rules.

6. The method of claim 1, further comprising:
executing, by the intelligent programmable logic controller, the control program using a first core of a processor included in the intelligent programmable logic controller,
wherein the one or more reasoning algorithms are dynamically modified using a second core of the processor included in the intelligent programmable logic controller.

7. The method of claim 1, wherein the one or more user-specified declarative knowledge models comprise an indication of one or more soft-sensors available in the control program.

8. The method of claim 7, wherein the modification of the one or more reasoning algorithms results in a new reasoning algorithm which performs a process comprising:
determining updated soft-sensor values corresponding to the one or more soft-sensors during each scan cycle; and
storing the updated soft-sensor values during each scan cycle on a non-volatile computer-readable storage medium operably coupled to the intelligent programmable logic controller.

9. An intelligent programmable logic controller comprising:
one or more processors configured to execute, according to a scan cycle, a control program that reads process data received from one or more production devices in an industrial automation system and provides instructions to control the one or more production devices;
a volatile computer-readable storage medium comprising a process image area;
a non-volatile computer-readable storage medium for storing:

a pre-defined knowledge model and a custom knowledge model connected syntactically via shared signature items and connected semantically via assertions on relation between elements of the pre-defined knowledge model and the custom knowledge model, wherein the custom knowledge model includes user-specified declarative knowledge having at least one of process-specific information on parameters, required functionalities, or process-specific analytical functionality, a pre-defined reasoning model and a custom reasoning model, wherein the pre-defined reasoning model and the custom reasoning model integrate one or more reasoning algorithms into the intelligent programmable logic controller; and a plurality of controller components executed by the one or more processors according to the scan cycle, the plurality of controller components comprising:

a data connector component with a deployment interface configured to receive a customer configuration from an external server, the customer configuration having information including rules, parameters, and attribute values for customizing the custom knowledge model and the custom reasoning model, a data analytics component with an automated reasoner module configured to execute one or more reasoning algorithms for analyzing data received and transmitted via the data connector component, wherein the reasoning algorithms process the pre-defined knowledge model and the custom knowledge model with the process data for learning improved monitoring and alarming functions, and a contextualization component with a knowledge manager configured to dynamically modify the configuration of the one or more reasoning algorithms during runtime of the intelligent programmable logic controller based on the customer configuration, while remaining functionality of the control program remains operative in one or more separate processing threads.

10. The intelligent programmable logic controller of claim 9, wherein the deployment interface comprises a web server interface.

11. The intelligent programmable logic controller of claim 9, wherein the automated reasoner module comprises a rules engine.

12. The intelligent programmable logic controller of claim 9, wherein the one or more processors comprise:

a first processor core configured to execute the control program; and a second processor core configured to modify the one or more reasoning algorithms in parallel with execution of the control program.

13. The intelligent programmable logic controller of claim 9, wherein the one or more processors execute a plurality of threads comprising:

a first thread configured to execute the control program; and one or more second threads configured to modify the one or more reasoning algorithms.

14. An article of manufacture for operating an intelligent programmable logic controller over a plurality of scan cycles, the article of manufacture comprising a non-transitory, tangible computer-readable medium holding computer-executable instructions for performing a method comprising:

executing a control program that reads process data received from one or more production devices in an industrial automation system and provides instructions to control the one or more production devices;

executing one or more reasoning algorithms for analyzing data received and transmitted by the intelligent programmable logic controller, wherein the reasoning algorithms process the pre-defined knowledge model and the custom knowledge model with the process data for learning improved monitoring and alarming functions;

receiving a customer configuration from an external server, the customer configuration having information including rules, parameters, and attribute values for customizing the custom knowledge model and the custom reasoning model; and dynamically modifying the configuration of the one or more reasoning algorithms during runtime of the intelligent programmable logic controller based on the customer configuration, while remaining functionality of the control program remains operative in one or more separate processing threads.

15. The article of manufacture of claim 14, wherein the one or more vendor-specified knowledge models comprise information related to one or more capabilities of the intelligent programmable logic controller, diagnostic knowledge available at the intelligent programmable logic controller, and a data layout information used by the intelligent programmable logic controller.

16. The article of manufacture of claim 14, wherein the method further comprises:

executing the control program using a first core of a processor included in the intelligent programmable logic controller, wherein the one or more reasoning algorithms are dynamically modified using a second core of the processor included in the intelligent programmable logic controller.

17. The article of manufacture of claim 14, wherein user-specified declarative knowledge models comprise an indication of one or more soft-sensors available in the control program.

18. The article of manufacture of claim 17, wherein the modification of the one or more reasoning algorithms results in the one or more reasoning algorithms to perform a process comprising:

determining updated soft-sensor values corresponding to the one or more soft-sensors during each scan cycle; and storing the updated soft-sensor values during each scan cycle on a non-volatile computer-readable storage medium operably coupled to the intelligent programmable logic controller.

* * * * *